United States Patent [19]
Korner et al.

[11] 3,954,308
[45] May 4, 1976

[54] DIVISIBLE CONNECTOR FOR TRACK LAYING CHAINS OF TRACK LAYING VEHICLES

[75] Inventors: Otto Korner, Wermelskirchen; Klaus Spies, Remscheid, both of Germany

[73] Assignee: Diehl, Nurnberg, Germany

[22] Filed: Jan. 6, 1975

[21] Appl. No.: 539,003

[30] Foreign Application Priority Data
Jan. 5, 1974 Germany............................ 2400481

[52] U.S. Cl..................................... 305/40; 305/56
[51] Int. Cl.²........................................ B62D 55/20
[58] Field of Search .................. 305/40, 41, 45, 50, 305/52, 56–58

[56] References Cited
UNITED STATES PATENTS

| | | | |
|---|---|---|---|
| 2,008,214 | 7/1935 | Knox | 305/54 X |
| 2,389,438 | 11/1945 | Knox | 305/56 X |
| 2,390,542 | 12/1945 | Knox | 305/56 X |
| 2,933,351 | 4/1960 | Backhaus | 305/57 X |
| 3,096,661 | 7/1963 | Reinsma | 305/58 X |

*Primary Examiner*—Philip Goodman
*Attorney, Agent, or Firm*—Walter Becker

[57] ABSTRACT

A divisible guiding and connector arrangement for track laying chains of track laying vehicles, in which tubular bodies surrounding sections of successive chain bolts between the pertaining chain links are vulcanized onto the aforementioned chain bolt sections. The tubular bodies are firmly interconnected by connecting means, e.g., by screw means or by clamping elements interconnected by screw means.

9 Claims, 12 Drawing Figures

*Prior Art*
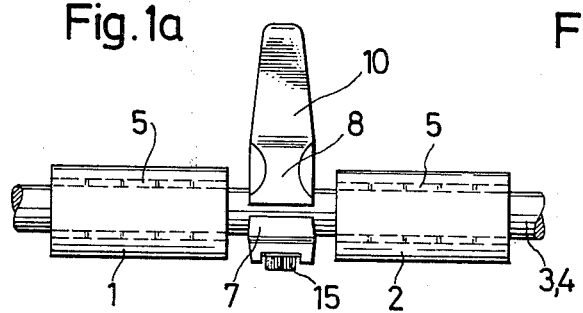
Fig. 1a
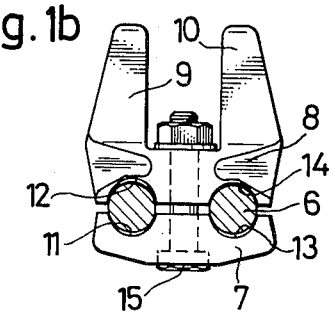
Fig. 1b
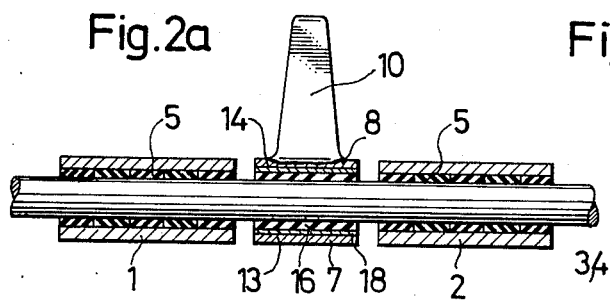
Fig. 2a
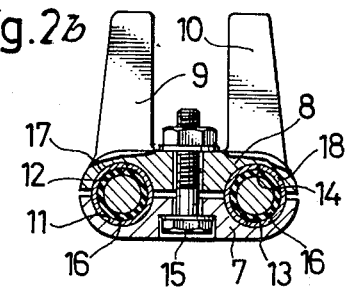
Fig. 2b
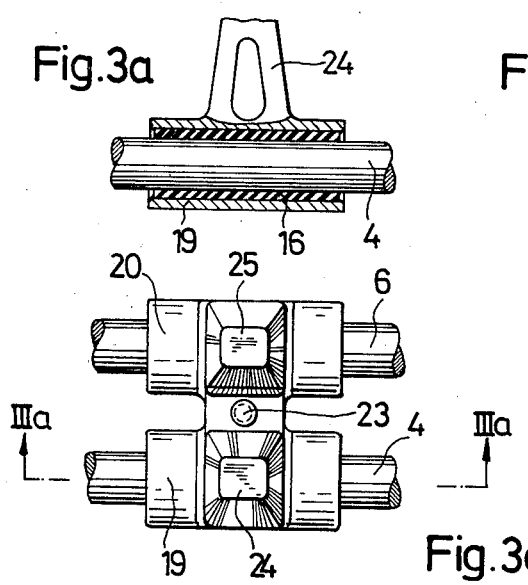
Fig. 3a
Fig. 3c
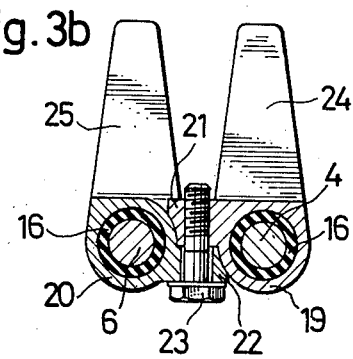
Fig. 3b

DIVISIBLE CONNECTOR FOR TRACK LAYING CHAINS OF TRACK LAYING VEHICLES

The present invention relates to a divisible central track guiding and/or connecting body of which the track bolts between the parts extending around the chain elements are connected to each other by screws or the like.

Heavy track-laying vehicles require, for purposes of reducing the specific ground pressure, a major supporting surface which in heretofore known manner is obtained by two tubular bodies which are arranged adjacent to each other and through which extend chain or track bolts which are common to both tubular bodies. While the chain bolts at their ends are by known clamping connectors connected to the respective adjacent chain bolts of the next following pair of tubular bodies, for purposes of connecting the chain bolts between adjacent tubular bodies, divisible connectors have become known which primarily also have a central guiding tooth. Heretofore known divisible track chain guiding and/or connecting bodies comprise for instance an upper and a lower part which are provided with semi-bores for the chain bolts of successive track links and by means of which they extend over the chain bolts between the chain or track links. The upper and lower parts are by a screw connection firmly connected to the track bolts. With this type of central guiding or connecting bodies, due to the finishing tolerances and deformations, frequently a non-uniform clamping of the chain or track bolts occurs. Furthermore, when driving the vehicle, the track bolts, above all within the region of the connectors, are subjected to a high permanent alternating load, and at the track bolts within the region of the clamping area, also a working-in occurs. As a result thereof, not only the clamped-on parts lose the clamping tension necessary for a proper fit but the track bolts, within the region of the margin of the body sections are, due to the occurring notch effect, exposed to an increased danger of breaking.

In order to overcome these drawbacks, in other words, to prevent a loosening of the central guiding means or central area connectors, the semi-bores at the zenith of their curvature are provided with recesses which extend axially over the entire length of the semi-bores. As a result thereof, a considerably better distribution of the clamping surfaces over the circumference of the chain bolts will be realized. With this design of the body sections, however, the high alternating stresses of the chain or track bolt at the rim of the central connector cannot be obviated to the desired extent.

It is, therefore, an object of the present invention to provide a divisible central guiding or connecting body which will not only assure a safe fit of the connecting bodies on the chain bolts but will also reduce the alternating load occuring within the region of the connecting body, thereby reducing the danger of the chain bolts or track bolts breaking.

These and other objects and advantages of the invention will appear more clearly from the following specification in connection with the accompanying drawings, in which:

FIG. 1a diagrammatically illustrates a front view of a heretofore known central guiding body.

FIG. 1b is a side view of FIG. 1a.

FIG. 2a diagrammatically illustrates a front view of a central guiding body according to the invention.

FIG. 2b is a side view of the arrangement shown in FIG. 2a.

FIG. 3a illustrates a different design of a central guiding body according to the invention and shows the same in a longitudinal section.

FIG. 3b represents a cross section of FIG. 3a.

FIG. 3c represents a top view of FIG. 3a.

FIG. 4b is a top view of FIG. 4a, and

FIGS. 5 to 7 illustrate cutouts of modifications of the arrangement shown in FIG. 4a.

Figure 4A:
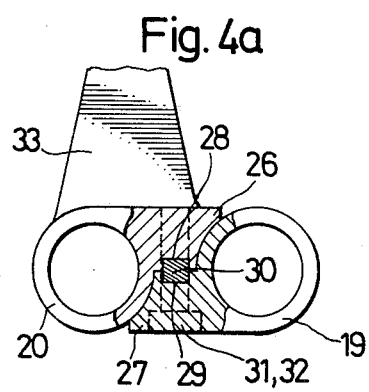
FIG. 4a is a side view of a further modification according to the invention.

The divisible chain link central guiding and/or connecting body providing parts extending around the chain bolts between the track links and interconnected by screw connections, is characterized primarily by tubular bodies which are adapted to be coupled together through connecting elements and which bodies are placed upon rubber rings which between the track links are vulcanized onto the track bolts which extend through the tubular bodies of the chain or track links.

In this connection, the connecting links may be designed as horizontally divisible tubular bodies which comprise an upper and a lower part and are placed upon the rubber rings of the chain or track bolts while having semi-bores directed to each other and surrounding the central guiding body. However, also the tubular bodies themselves may be provided with formed-on interengaging or mutually overlapping protrusions, flaps or plates, said protrusions or flaps being adapted to be coupled by a screw connection. Furthermore, the tubular bodies or the protrusions thereof which engage over each other or overlap each other may be provided with an inserted or engaging fitting member. The position fixing engagment may, however, also be brought about by other means, for instance, by interengaging teeth mounted on said protrusions.

By means of the tubular bodies placed upon the rubber rings of the track bolts, it will be assured that the load shocks are not only considerably cushioned by the rubber layer but are also conveyed to a major portion of the circumference of the track bolts. Furthermore, the shearing and upsetting load is greatly reduced, and a working-in of the body into the chain bolts will be avoided.

Referring now to the drawings in detail, according to FIGS. 1a and 1b two axially adjacent tubular bodies 1, 2 are passed through by track bolts 3, 4. Elastically pivotally journalled on said bolts 3, 4 are the said tubular bodies 1, 2 through the intervention of rubber rings 5 which are vulcanized onto the chain bolts 3, 4. Between the tubular bodies 1, 2, the chain bolts 3, 4 are through divisible connectors coupled to the track bolt 6 of the respective next following tubular bodies. These connectors comprise primarily a lower section 7 and an upper section 8 which is provided with guiding teeth 9, 10. These connector upper and lower parts 7, 8, which by means of semi-bores 11, 12 and 13, 14 facing each other and surrounding the bolts 4, 6, are connected to each other by a clamping screw 15 and are adapted to be clamped fast onto the chain bolts 4, 6. As has already been described, in this way, metal engages metal. Moreover, the looping and engagement is not uniform on all sides.

FIGS. 2a and 2b represent two axially adjacent tubular bodies 1, 2 on rubber rings 5 of bolts 3, 4. In contrast to FIGS. 1a and 1b, in this instance the chain bolts 3, 4 and 6 are between the tubular bodies 1, 2 likewise provided with vulcanized-on rubber rings 16. Analogous to the tubular bodies 1, 2, for instance, metallic sleeves 17, 18 are slipped onto said rubber rings 16. Only the metal sleeves 17, 18 elastically mounted on the bolts 3, 4, 6 are interconnected by suitable clutch means as for instance a central connector 7–10 according to FIG. 1b. In this way, not only uniform distribution of the supporting forces from the metal sleeves 17, 18 to the bolts 3, 4, 6 is obtained, but also a cushioning of shocks which through the central guiding and connecting member 7–10 pass onto the chain bolts 3, 4, 6.

Instead of coupling the bolts 4, 6 to each other through a connector 7–10 known per se, which connector is tensioned onto the metal sleeves 17, 18 slipped onto the rubber ring 16, it will be seen from FIGS. 3a to 3c that tubular bodies 19, 20 with laterally formed-on interengaging or mutually overlapping protrusions or plates 21, 22 may be provided which are adapted to be coupled to each other by a screw connection 23. Each of the bodies 19, 20 is provided with a guiding tooth 24, 25.

These tubular bodies 19, 20 are simultaneously with the slipping on of the tubular bodies 1, 2 slipped onto the bolts 3, 4, 6 or the rubber rings 5 thereof or in a reverse manner are during the introduction of the chain or track bolts 3, 4, 6 into the tubular bodies 1, 2 moved onto the bolts 3, 4, 6 which means onto the rubber rings 16, which are arranged within the region of the central guiding or connecting body and are vulcanized onto the track bolts 3, 4. The interengaging protrusions 21, 22 are then firmly interconnected by a screw 23.

In order to assure that the alternating pull and torsion forces exerted onto the bodies 19, 20 to be interconnected will not have to be absorbed by screw 23 alone whereby screw 23 would eventually become loose or be damaged over a longer period of time, it is suggested according to FIG. 4a to insert a fitting member 30 into recesses 28, 29 which face each other and pertain to overlapping protrusions 26, 27. This fitting member 30 is adapted to absorb pull and shearing forces in a direction of and transverse to the direction of movement of the track whereby said pull and shearing forces are kept away by screwing means formed by two screws 31 and 32. The depression 28 and 29 extend parallely with regard to the axes of the tubular bodies 19, 20. In the above referred to example, only one body 20 is provided with the guiding tooth 33.

Figure 5:
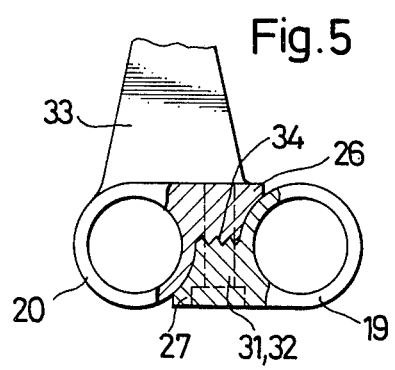
Figure 4B:
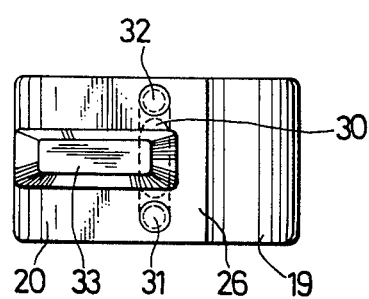
Figure 6:
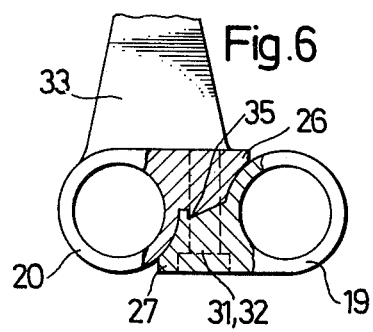
Figure 7:
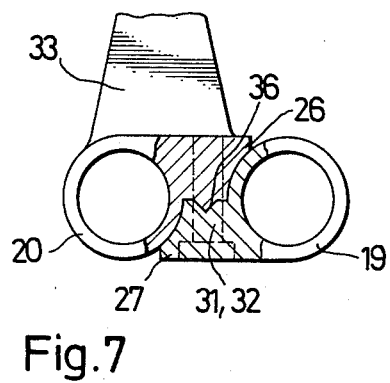

Instead of a connection by means of a separate fitting member 30 in conformity with FIGS. 4a and 4b, the protrusions which overlap each other may also be provided with interengaging teeth 34 according to FIG. 5 or with interengaging teeth 36 according to FIG. 7 or a ratchet-pawl mechanism 35 according to FIG. 6.

It is, of course, to be understood that the present invention is, by no means, limited to the specific showing in the drawings, but also comprises any modifications within the scope of the appended claims.

What we claim is:

1. In combination: two successive bolts of a track laying chain arranged parallel to and one behind the other in transversely spaced relationship to each other, two sleeves of elastomeric material respective vulcanized onto said bolts as an elastic intermediate insert layer over the entire range thereof to equalize load distribution transmitted uniformly thereby so as to reduce localized scouring coining and danger of breakage and in alignment with each other in a direction transverse to the axial direction of said bolts, tubular bodies respectively journalled elastically as mounted directly on said sleeves, and connecting means interconnecting said elastically journalled tubular bodies.

2. An arrangement according to claim 1, in which said connecting means includes two plate-shaped sections facing each other and having each of those surfaces thereof which face each other provided with two longitudinal transversely spaced grooves so that the two grooves of one of said sections together with the two grooves of the other section formly confine said tubular bodies, and a connecting member extending through and firmly holding said plate-shaped sections together.

3. An arrangement according to claim 2, in which said grooves have at least approximately a semi-circular cross section.

4. An arrangement according to claim 1, in which said tubular bodies form separate bodies, and in which said connecting means extend through and firmly interconnect said separate bodies to each other.

5. An arrangement according to claim 4, in which said separate tubular bodies have interengaging extensions.

6. An arrangement according to claim 4, in which said separate tubular bodies have extensions overlapping each other and provided with bores for receiving a portion of said connecting means.

7. An arrangement according to claim 4, which includes a fitting piece interposed between and partially extending into both of said separate bodies to align the same and holding the same in alignment.

8. An arrangement according to claim 4, in which said separate bodies have intermeshing teeth.

9. In a track laying chain for track laying vehicles: a first pair of chain links axially aligned with each other and in axially spaced relationship to each other; a second pair of chain links axially aligned with each other and in substantially the same spaced relationship to each other as the chain links of said first pair of chain links, the chain links of one of said two pairs of chain links being located substantially parallel to and opposite the chain links of the other pair of chain links; each of said chain links of each of said pair of chain links including bolt means and sleeve means of elastomeric material vulcanized to the pertaining bolt means and also including tubular body means elastically journalled on the pertaining sleeve means of elastomeric material; and connector means arranged between the chain links of said first pair of chain links and also between the chain links of said second pair of chain links and elastically interconnecting the bolt means of said first pair of chain links and the bolt means of said second pair of chain links; said connector means including a first sleeve of elastomeric material vulcanized to the bolt means of said first pair of chain links and also including metallic sleeve means surrounding said last mentioned sleeve of elastomeric material and mounted thereon; said connector also including a second sleeve of elastomeric material vulcanized to the bolt means of said second pair of chain links and also including metallic sleeve means surrounding said last mentioned second sleeve of elastomeric material and mounted thereon; and connecting means firmly connecting to each other the metallic sleeve means respectively mounted on said first and second sleeve of said connector means.

* * * * *